US012660792B1

(12) United States Patent
Feng

(10) Patent No.: US 12,660,792 B1
(45) Date of Patent: Jun. 23, 2026

(54) PETAL-SHAPED CAT BED

(71) Applicant: WARM UNIVERSE HOME PRODUCTS CO., LTD., Nantong (CN)

(72) Inventor: Aiguo Feng, Nantong (CN)

(73) Assignee: WARM UNIVERSE HOME PRODUCTS CO., LTD., Nantong (CN)

( * ) Notice: Subject to any disclaimer, the term of this patent is extended or adjusted under 35 U.S.C. 154(b) by 0 days.

(21) Appl. No.: 19/399,730

(22) Filed: Nov. 25, 2025

(30) Foreign Application Priority Data

Sep. 29, 2025 (CN) .......................... 202522099573.0

(51) Int. Cl.
A01K 1/035 (2006.01)
(52) U.S. Cl.
CPC .................................. A01K 1/0353 (2013.01)
(58) Field of Classification Search
CPC ...... A01K 1/035; A01K 1/0353; A47C 7/024; A47C 16/04; A47C 20/02; A47C 16/005; A47C 16/02
See application file for complete search history.

(56) References Cited

U.S. PATENT DOCUMENTS

| | | | | |
|---|---|---|---|---|
| D299,665 S | * | 1/1989 | David ........................... | D21/520 |
| 6,540,301 B1 | * | 4/2003 | Bottoms ................. | A47C 9/025 |
| | | | | 135/65 |
| 6,859,964 B1 | * | 3/2005 | Arnott .................... | A47C 20/00 |
| | | | | 5/636 |
| D1,057,301 S | * | 1/2025 | Wu .............................. | D30/118 |
| 2002/0104166 A1 | * | 8/2002 | Mangiaracina ........ | A47D 13/08 |
| | | | | 297/181 |
| 2010/0071627 A1 | * | 3/2010 | Beard ................... | A01K 1/0353 |
| | | | | 119/61.5 |
| 2012/0318206 A1 | * | 12/2012 | van Leeuwen ...... | A01K 5/0114 |
| | | | | 248/163.1 |
| 2013/0284099 A1 | * | 10/2013 | Oakes, Jr. .............. | A01K 29/00 |
| | | | | 119/28.5 |
| 2014/0190417 A1 | * | 7/2014 | Lipscomb ............ | A01K 1/0353 |
| | | | | 119/28.5 |

* cited by examiner

*Primary Examiner* — Kimberly S Berona
*Assistant Examiner* — Katherine June Walter
(74) *Attorney, Agent, or Firm* — Cooper Legal Group, LLC

(57) ABSTRACT

A petal-shaped cat bed includes a base, where the base is configured with an accommodation groove for a pet to rest in, an outer side wall of the base is provided with a plurality of petal-shaped plates, and the plurality of petal-shaped plates are positioned at an opening of the accommodation groove.

6 Claims, 4 Drawing Sheets

PETAL-SHAPED CAT BED

CROSS-REFERENCE TO RELATED APPLICATION

This application claims the priority benefit of China application No. 202522099573.0, filed on Sep. 29, 2025. The entirety of China application No. 202522099573.0 is hereby incorporated by reference herein and made a part of this specification.

TECHNICAL FIELD

The present application relates to the technical field of pet supplies, and in particular, to a petal-shaped cat bed.

DESCRIPTION OF RELATED ART

Currently, most cat beds on the market feature conventional round or square designs and primarily made of materials such as plastic, fabric, or wood. Although these cat beds fulfill cats' basic need for rest, they often lack diversity in aesthetic design and playfulness, resulting in limited appeal and innovation. In recent years, with the rapid development of the pet economy, consumers have shown growing demand for personalized and aesthetically appealing pet products. Therefore, there is an urgent need for innovative cat bed designs that integrate both practical functionality and visual appeal.

SUMMARY

To improve the aesthetic appeal and playfulness of pet supplies, the present application provides a petal-shaped cat bed.

The petal-shaped cat bed provided by the present application adopts the following technical solution:

A petal-shaped cat bed includes a base, where the base is configured with an accommodation groove for a pet to rest in, an outer side wall of the base is provided with a plurality of petal-shaped plates, and the plurality of petal-shaped plates are positioned at an opening of the accommodation groove.

By adopting the above technical solutions, the pet may enter the accommodation groove to rest through the gaps between the adjacent petal-shaped plates. The petal-shaped plates not only provide privacy protection but also ensure ventilation, while enhancing the overall aesthetic appeal and playfulness of the cat bed.

Optionally, three petal-shaped plates are provided, namely a first decorative plate, a second decorative plate, and a third decorative plate, the first decorative plate, the second decorative plate, and the third decorative plate are all fixed to the outer side wall of the base, and the first decorative plate and the third decorative plate are symmetrically about a centerline of the second decorative plate.

By adopting the above technical solutions, the first decorative plate, the second decorative plate, and the third decorative plate are seamlessly connected in sequence at ends thereof close to the base, additionally the first decorative plate and the third decorative plate are symmetrically arranged about the centerline of the second decorative plate, such that a pet may enter the accommodation groove easily while enhancing the overall aesthetic appeal.

Optionally, in a usage position of the petal-shaped cat bed, a top wall of the base is inclined, the second decorative plate is located above the first decorative plate and the third decorative plate, and the first decorative plate and the third decorative plate are situated at a same height.

By adopting the above technical solutions, the accommodation groove is inclined following the top wall of the base. When a pet rests within the accommodation groove, the inclined accommodation groove can promote the cat's digestive system and improve sleep quality.

Optionally, a connecting ring is sleeved on the base, the first decorative plate, the second decorative plate, and the third decorative plate are all fixed to the connecting ring, and the connecting ring is detachably connected with the base.

Optionally, aa top end of the base is configured with a connecting groove in the outer side wall of the base for the connecting ring to be embedded in, the connecting ring is adapted to the connecting groove, a bottom wall of the connecting groove is provided with a plurality of positioning posts, the connecting ring is configured with positioning slots, the plurality of positioning posts are inserted into the positioning slots, and the plurality of positioning posts are in interference fit with the positioning slots.

By adopting the above technical solutions, the positioning posts are in interference fit with the positioning slots, enabling the quick disassembly and assembly of the connecting ring and the connecting groove, thereby achieving quick assembly and disassembly of the petal-shaped plates and the base, which facilitates the assembly and portability of the cat bed.

Optionally, the accommodation groove is hemispherical, and a bottom wall of the accommodation groove is provided with a memory foam layer.

By adopting the above technical solutions, the hemispherical accommodation groove provides a safer environment for the pet, and the memory foam layer is conducive to enhancing the comfort of the pet when resting within the accommodation groove.

Optionally, a surface of each of the plurality of petal-shaped plates is formed with a curved surface.

By adopting the above technical solutions, the curved surface enhances the resemblance of the petal-shaped plate to the natural form of a real petal, thereby further improving the aesthetic appeal. Additionally, the inherent curvature of the surface of the petal-shaped plate allows for the placement of toys or food, increasing its functionality.

Optionally, the base tapers inward along a height of the base.

By adopting the above technical solutions, the base is more stable, improving the overall strength and support effect.

In conclusion, the present application includes at least one of the following beneficial technical effects:

1. By the accommodation groove and the petal-shaped plates, namely the first decorative plate, the second decorative plate, and the third decorative plate, the pet may enter the accommodation groove to rest through the gaps between the adjacent petal-shaped plates. The petal-shaped plates not only provide privacy protection but also ensure ventilation, while enhancing the overall aesthetic appeal and playfulness of the cat bed.

2. By the connecting ring, the connecting groove, the positioning posts, and the positioning slots, and through the mutual cooperation between the positioning slots and the positioning posts, quick assembly and disassembly of the connecting ring and the connecting groove is achieved, thereby enabling quick assembly and disassembly of the petal-shaped plates and the base, which facilitates the assembly and portability of the cat bed.

3

3. By the hemispherical accommodation groove, a safer environment can be provided for the pet, and the memory foam layer within the accommodation groove is conducive to enhancing the comfort of the pet when resting inside.

DESCRIPTION OF THE EMBODIMENTS

The present application is described in further detail below in combination with FIGS. 1-4.

First Embodiment

Figure 1:
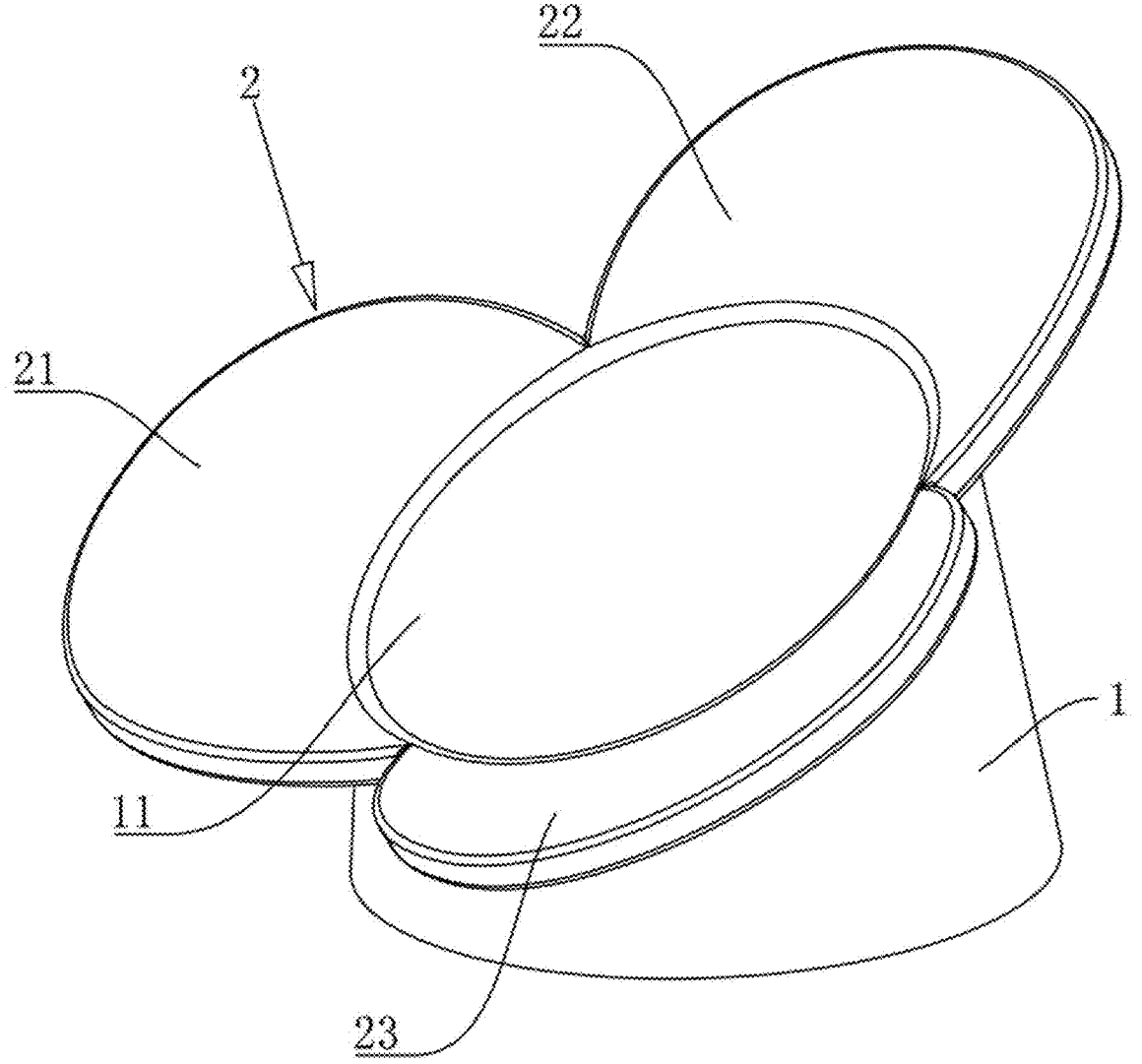
FIG. 1 is a schematic view of a petal-shaped cat bed according to the first embodiment of the present application.
Figure 2:
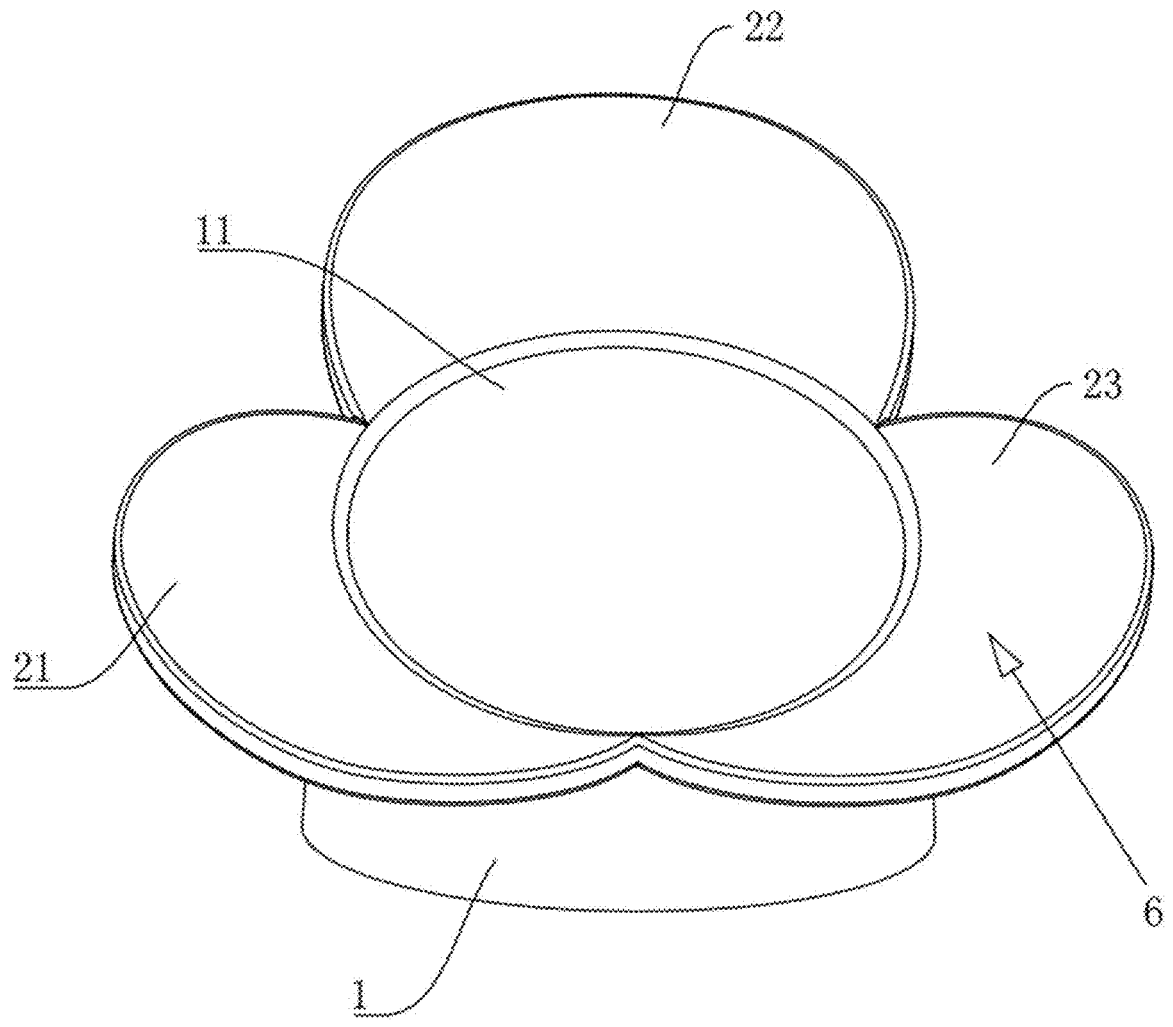
FIG. 2 is a schematic view of the petal-shaped cat bed according to the first embodiment of the present application from another perspective.

Referring to FIGS. 1 and 2, the present embodiment discloses a petal-shaped cat bed including a base 1. A top wall of the base 1 is configured with an accommodation groove 11, allowing pets to enter and rest. A plurality of petal-shaped plates 2 are symmetrically arranged on an outer side wall of the base 1 and positioned at an opening of the accommodation groove 11. In this embodiment, three petal-shaped plates 2 are provided, including a first decorative plate 21, a second decorative plate 22, and a third decorative plate 23, all of which are fixed to the outer side wall of the base 1. The first decorative plate 21 and the third decorative plate 23 are arranged symmetrically about a centerline of the second decorative plate 22. The first decorative plate 21, the second decorative plate 22, and the third decorative plate 23 are seamlessly connected in sequence at ends thereof close to the base 1. A pet may enter the accommodation groove 11 to rest through gaps between the adjacent petal-shaped plates 2. The petal-shaped plates 2 not only provide privacy protection but also enhance the overall aesthetic appeal and playfulness of the cat bed.

Figure 3:
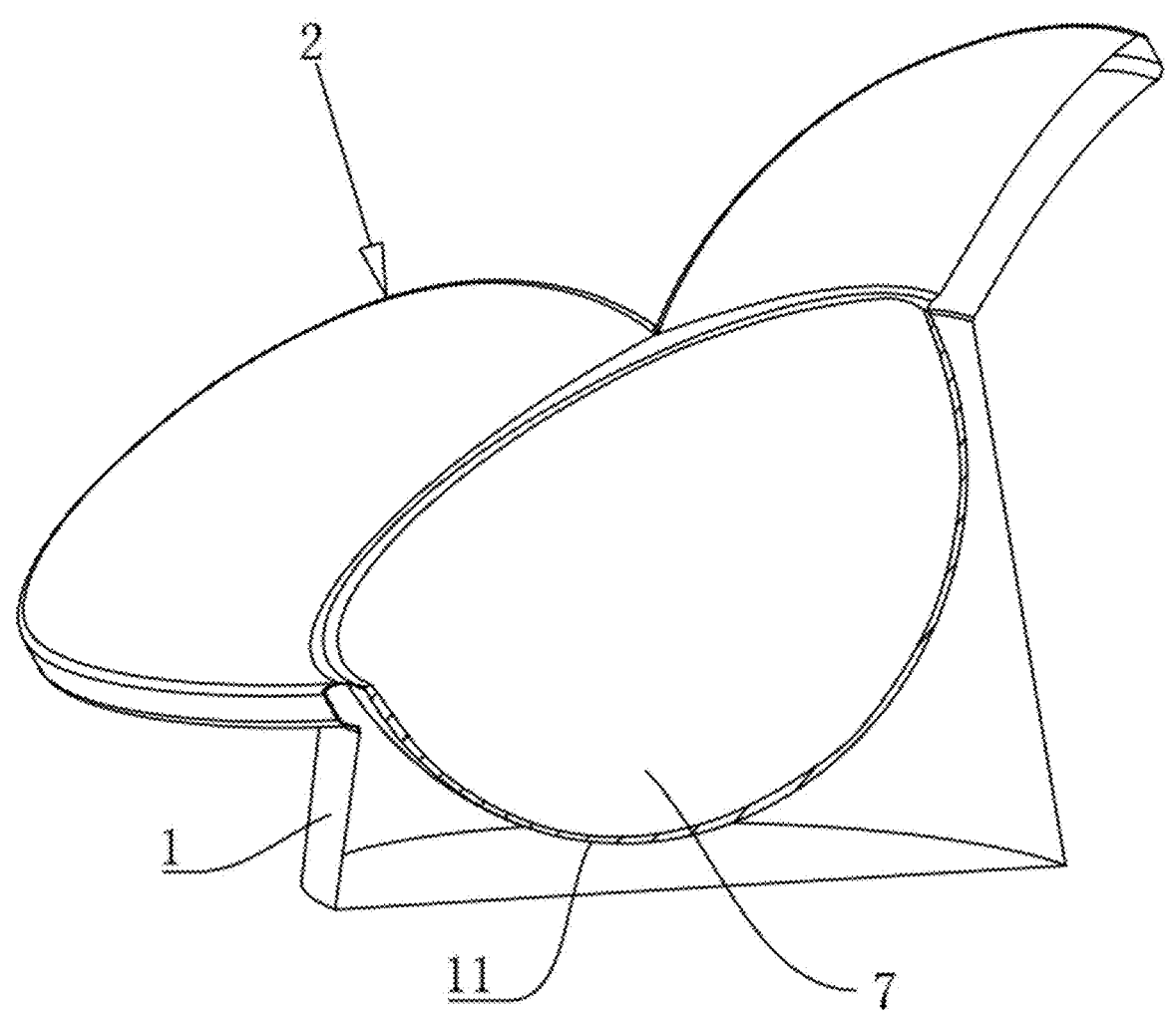
FIG. 3 is a cross-sectional view of the petal-shaped cat bed according to the first embodiment of the present application.

Referring to FIGS. 2 and 3, in the usage position, a top wall of the base 1 is inclined. The second decorative plate 22 is located above the first decorative plate 21 and the third decorative plate 23, and the first decorative plate 21 and the third decorative plate 23 are situated at a same height. The accommodation groove 11 is inclined following the top wall of the base 1. When a pet rests within the accommodation groove 11, the inclined accommodation groove 11 can promote the cat's digestive system and improve sleep quality.

Referring to FIGS. 2 and 3, the accommodation groove 11 is hemispherical in design, to provide a greater sense of security for pets, with a memory foam layer 7 embedded in the bottom wall thereof, to enhance the comfort during the pet rests within the accommodation groove 11.

Referring to FIG. 2, a surface of each petal-shaped plate 2 is formed with a curved surface 6, which enhance the resemblance of the petal-shaped plate 2 to the natural form of a real petal, thereby further improving the aesthetic appeal. Additionally, the inherent curvature of the surface of the petal-shaped plate 2 allows for the placement of toys or food, increasing its functionality.

The operating principle of the petal-shaped cat bed in this embodiment is as follows: a pet enters the accommodation groove 11 to rest through the gaps between adjacent petal-shaped plates 2. The design of the petal-shaped plates 2 provide privacy protection and ensures ventilation. The use of the petal-shaped cat bed also enhances the overall aesthetic appeal and playfulness of the cat bed.

Second Embodiment

Figure 4:
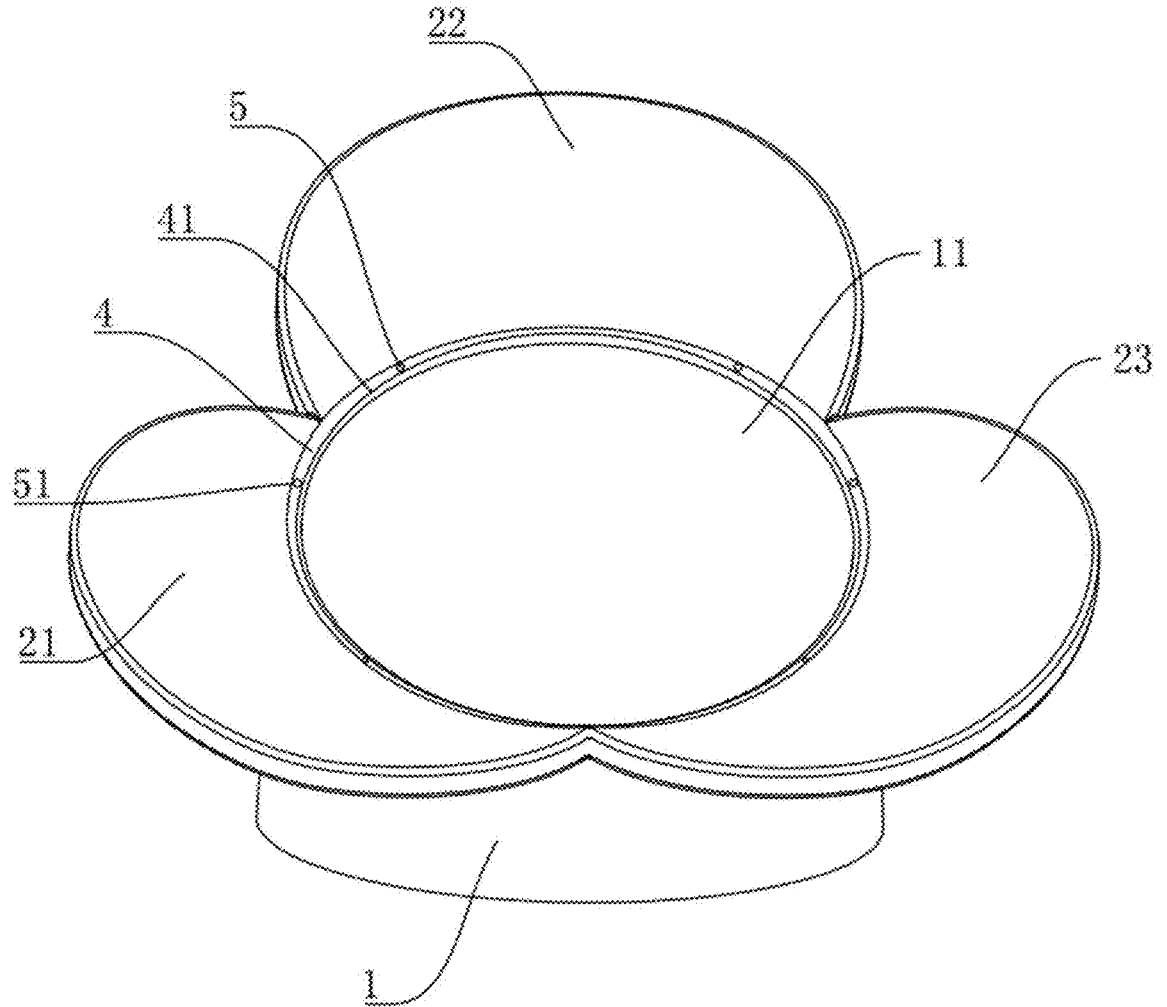
FIG. 4 is a schematic view of a petal-shaped cat bed according to the second embodiment of the present application.

Referring to FIG. 4, a difference between this embodiment and the first embodiment lies in that a connecting ring 4 is sleeved on the base 1. The first decorative plate 21, the second decorative plate 22, and the third decorative plate 23 are all fixed to the connecting ring 4. The top end of the base 1 is configured with a connecting groove 41 in its side wall. The connecting ring 4 is embedded in the connecting groove 41, so that the connecting ring engages adaptively with the connecting groove 41. A bottom wall of the connecting groove 41 is fixedly provided with a plurality of positioning posts 5. The connecting ring 4 is configured with positioning slots 51 for insertion of the positioning posts 5. The positioning posts 5 are in interference fit with the positioning slots 51. Through the cooperation between the positioning slots 51 and the positioning posts 52, the connecting ring 4 and the connecting groove 41 can be quickly assembled and disassembled, thereby achieving rapid assembly and disassembly of the petal-shaped plates 2 and the base 1, which facilitates the assembly and portability of the cat bed.

The above are all the exemplary embodiments of the present application, and the protection scope of the present application is not limited thereby. Therefore, all equivalent changes made in accordance with the structure, shape and principle of the present application shall be covered within the protection scope of the present application.

LIST OF REFERENCE SIGNS

1 base
11 accommodation groove
2 petal-shaped plate
21 first decorative plate
22 second decorative plate
23 third decorative plate
4 connecting ring
41 connecting groove
5 positioning post
51 positioning slot
6 curved surface
7 memory foam layer

What is claimed is:

1. A petal-shaped cat bed, comprising a base, wherein the base is configured with an accommodation groove for a pet to rest in, an outer side wall of the base is provided with a plurality of petal-shaped plates, and the plurality of petal-shaped plates are positioned at an opening of the accommodation groove, the plurality of petal-shaped plates are three petal-shaped plates, namely a first decorative plate, a second decorative plate, and a third decorative plate, the first decorative plate, the second decorative plate, the third decorative plate are all fixed to the outer side wall of the base, the first decorative plate and the third decorative plate are symmetrically disposed about a centerline of the second decorative plate, a connecting ring is sleeved on the base, the first decorative plate, the second decorative plate, and the third decorative plate are all fixed to the connecting ring, and the connecting ring is detachably connected with the base.

2. The petal-shaped cat bed according to claim 1, wherein in a usage position of the petal-shaped cat bed, a top wall of the base is inclined, the second decorative plate is located above the first decorative plate and the third decorative plate, and the first decorative plate and the third decorative plate are situated at a same height.

3. The petal-shaped cat bed according to claim 1, wherein a top end of the base is configured with a connecting groove in the outer side wall of the base for the connecting ring to be embedded in, the connecting ring is adapted to the connecting groove, a bottom wall of the connecting groove is provided with a plurality of positioning posts, the connecting ring is configured with positioning slots, the plurality of positioning posts are inserted into the positioning slots, and the plurality of positioning posts are in interference fit with the positioning slots.

4. The petal-shaped cat bed according to claim 1, wherein the accommodation groove is hemispherical, and a bottom wall of the accommodation groove is provided with a memory foam layer.

5. The petal-shaped cat bed according to claim 1, wherein a surface of each of the plurality of petal-shaped plates is formed with a curved surface.

6. The petal-shaped cat bed according to claim 1, wherein the base tapers inward along a height of the base.

\* \* \* \* \*